United States Patent [19]

Watanabe et al.

[11] Patent Number: 5,577,384
[45] Date of Patent: Nov. 26, 1996

[54] BACK-UP PRESSURE INTENSIFIER FOR MASTER CYLINDER FAILURE

[75] Inventors: Satoru Watanabe; Masaki Machida; Masahiro Shimada, all of Saitama-ken, Japan

[73] Assignee: Jidosha Kiki Co., Ltd., Tokyo, Japan

[21] Appl. No.: 493,495

[22] Filed: Jun. 22, 1995

[30]    Foreign Application Priority Data

Jul. 15, 1994  [JP]  Japan .................................... 6-186681
Nov. 16, 1994  [JP]  Japan .................................... 6-306965

[51] Int. Cl.$^6$ ....................................................... B60T 15/00
[52] U.S. Cl. ............................ 60/550; 60/582; 303/122.09
[58] Field of Search ........................... 303/122.09, 113.3, 303/114.1, 115.4, 115.5, 84.2, DIG. 1, DIG. 2; 60/550, 563, 582

[56]              References Cited

U.S. PATENT DOCUMENTS 1,970,999   8/1934   Ferris et al. ............................ 60/563
4,986,613   1/1991   Nishii et al. .

FOREIGN PATENT DOCUMENTS 6-29011   4/1994   Japan .

Primary Examiner—Josie Ballato
Attorney, Agent, or Firm—Flynn, Thiel, Boutell & Tanis, P.C.

[57]             ABSTRACT

A braking unit includes an intensifier mechanism for intensifying a braking liquid pressure of a master cylinder upon failure of a liquid pressure booster. The braking unit comprises the intensifier mechanism for intensifying the braking liquid pressure of the master cylinder when actuated, and a control valve which makes the intensifier mechanism operable upon failure of the liquid pressure booster. The control valve comprises a valve member which is urged by a spring tensioned with a given load and which is urged in the opposite direction from the spring by a liquid pressure of a power chamber of the liquid pressure booster. The valve member makes the intensifier mechanism operable whenever the resilience of the spring exceeds the urging force produced by the liquid pressure in the power chamber of the liquid pressure booster. This prevents an operational lag of the intensifier mechanism in the event the liquid pressure booster fails.

20 Claims, 5 Drawing Sheets

BACK-UP PRESSURE INTENSIFIER FOR MASTER CYLINDER FAILURE

FIELD OF THE INVENTION

The invention relates to a braking unit, and more particularly, to a braking unit including an intensifier mechanism which intensifies a braking liquid pressure in a master cylinder upon failure or sinking of a liquid pressure booster.

DESCRIPTION OF THE PRIOR ART

A braking unit is known in the art including a master cylinder which applies a braking liquid pressure to a wheel cylinder, a liquid pressure booster disposed between a brake pedal and the master cylinder for boosting a force with which the brake pedal is depressed at a given ratio before it is transmitted to the master cylinder, an intensifier mechanism disposed in a braking liquid path which provides a communication between the wheel cylinder and the master cylinder and adapted to be actuated to intensify the braking liquid pressure in the master cylinder for transmission to the wheel cylinder, and a control valve for actuating the intensifier mechanism whenever the liquid pressure booster has failed or has sunk. (See Japanese Patent Publication No. 29,011/1994).

In a braking unit of the art as described above, a comparison is made between the liquid pressure in a power chamber of the liquid pressure booster and the liquid pressure in the master cylinder. The control valve is operated to switch a flow path for the braking liquid to actuate the intensifier mechanism when the liquid pressure in the power chamber falls below the liquid pressure in the master cylinder. This allows the braking liquid pressure in a master cylinder to be intensified by a factor on the order of two by the intensifier mechanism, and intensified braking liquid pressure is transmitted to the wheel cylinder. This assures a reliable brake operation if the liquid pressure booster should lose its booster function. Thus the intensifier mechanism functions as a fail-safe unit.

However, in a conventional arrangement, if the liquid pressure in the power chamber of the liquid pressure booster does not reduce to zero upon failure thereof, the control valve is only operable to actuate the intensifier mechanism after the depression of the brake pedal is continued and the liquid pressure in the master cylinder rises above the liquid pressure in the power chamber. Accordingly, in such conventional arrangement, the actuation of the intensifier mechanism tends to lag if any liquid pressure remains in the power chamber when the liquid pressure booster has failed, which is a disadvantage.

SUMMARY OF THE INVENTION

The invention relates to a braking unit including a master cylinder for applying a braking liquid pressure to a wheel cylinder, a liquid pressure booster disposed between a brake pedal and the master cylinder for boosting a force with which the brake pedal is depressed at a given ratio before it is transmitted to the master cylinder, an intensifier mechanism disposed in a braking liquid path which provides a communication between the wheel cylinder and the master cylinder that is adapted to be actuated to intensify the braking liquid pressure in the master cylinder for transmission to the wheel cylinder, and a control valve for actuating the intensifier mechanism upon failure of the liquid pressure booster. In view of the foregoing, in accordance with the invention, the control valve includes a valve member which is urged to an operative position by a spring having a preset load to make the intensifier mechanism operable and is moved to its inoperative position under the influence of a liquid pressure in a power chamber of the liquid pressure booster or a liquid pressure of a source of liquid pressure associated with the liquid pressure booster which acts in the opposite direction from the direction in which the resilience of the spring acts to make the intensifier mechanism inoperable. The valve member is moved from its inoperative to its operative position whenever the force which it experiences under the influence of the liquid pressure in the power chamber or the liquid pressure in the source of liquid pressure associated with the liquid pressure booster is reduced below the urging force from the spring.

With this arrangement, when the liquid pressure booster or a source of liquid pressure associated therewith fails, and the liquid pressure in the power chamber of the liquid pressure booster or the liquid pressure in the source associated therewith provides an urging force which is less than the resilience of the spring, the control valve becomes operative to make the intensifier mechanism operable. In this manner, the intensifier mechanism is immediately actuated as soon as the liquid pressure in the master cylinder is generated, thus effectively preventing any operational lag in the actuation of the intensifier mechanism when the liquid pressure booster or a source of liquid pressure associated therewith fails.

Above and other objects, features and advantages of the invention will become apparent from the following description of several embodiments thereof with reference to the drawings.

DETAILED DESCRIPTION OF EMBODIMENTS

Figure 1:
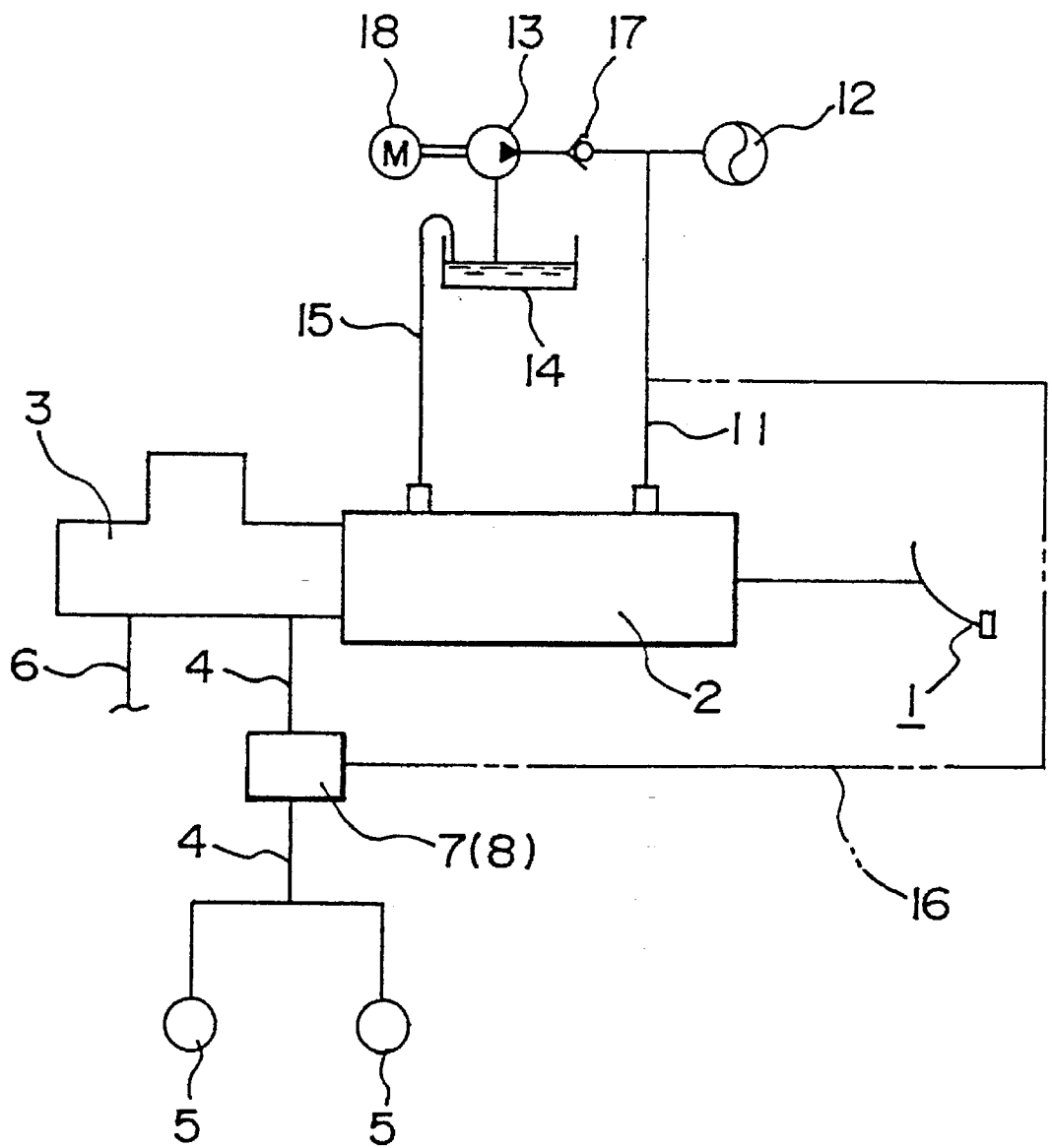
FIG. 1 is a schematic view of an entire system according to one embodiment of the invention.

Referring to the drawings, several embodiments of the invention will now be described. Initially referring to FIG. 1, a brake pedal 1 is connected to an input shaft of a liquid pressure booster 2, which is constructed in a known manner. The booster 2 includes an output shaft which is connected to a piston of a master cylinder 3. When the brake pedal 1 is depressed, the booster 2 boosts the force with which the brake pedal 1 is depressed at a given ratio before it is transmitted to the piston of the master cylinder 3.

In the present embodiment, the master cylinder 3 is of a tandem type, and operates to transmit a braking liquid pressure which is generated in response to the depression of the brake pedal 1 to front wheel cylinders 5 through a braking liquid path 4, and simultaneously transmit such pressure to rear wheel cylinders, not shown, through another braking liquid path 6.

An intensifier mechanism 7 and a control valve 8, to be described later, are disposed in the braking liquid path 4. Similarly, an intensifier mechanism 7 and a control valve 8 are disposed in the path 6 associated with the rear wheel cylinders, but they are not shown and will not be described herein since they are identical to those disposed in the path 4. When the booster mechanism 7 is actuated by the control valve 8, the braking liquid pressure which is generated in the master cylinder 3 is boosted before it is transmitted to the front wheel cylinders 5.

The liquid pressure booster 2 is connected through a liquid path 11 to an accumulator 12, and also connected to a pump 13 which is operated by a motor 18. A braking liquid which is contained in a reservoir 14 is pumped by the pump 13 to the accumulator 12, and thence to a power chamber of the liquid pressure booster 2. The braking liquid which is displaced from the booster 2 is returned to the reservoir 14 through a liquid path 15. It will be seen that a check valve 17 is disposed in a path extending between the reservoir and the pump and maintains a pump discharge pressure. It is to be noted that in the present embodiment, the liquid pressure from the accumulator 12 also acts upon the intensifier mechanism 7 through a braking liquid path 16.

Figure 2:
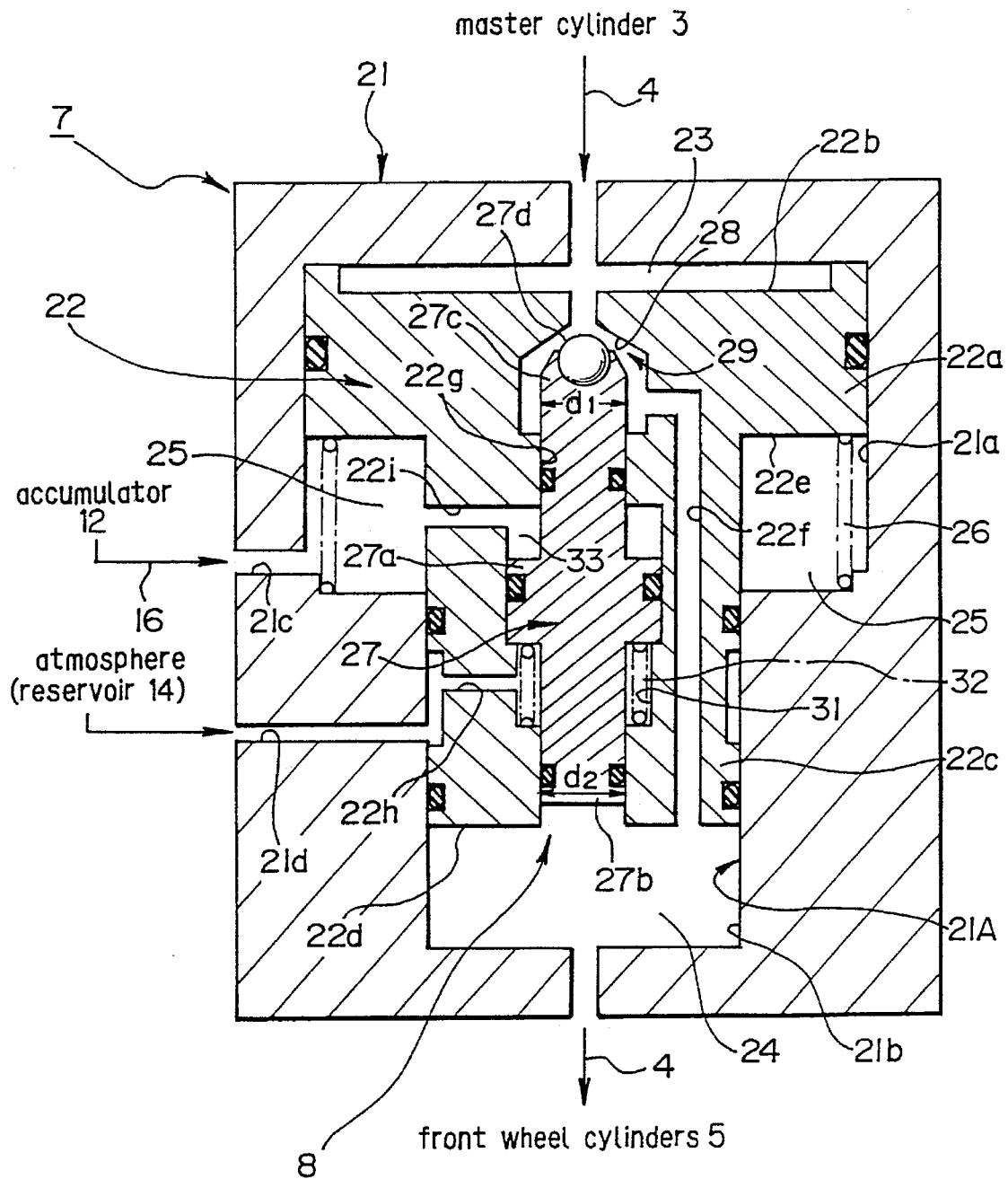
FIG. 2 is a cross section of certain components shown in FIG. 1.

Referrring to FIG. 2, the intensifier mechanism 7 includes a casing 21 having a stepped bore 21A formed therein in which a stepped piston 22 is slidably fitted in a liquid tight manner. In the present embodiment, the control valve 8 is assembled into the stepped piston 22.

The stepped piston 22 includes a large diameter portion 22a having an end face 22b, which defines a first pressure chamber 23 together with an opposing wall surface of the casing 21 and the wall surface of the stepped bore 21A which defines a large diameter bore 21a. The first pressure chamber 23 communites with the master cylinder 3 through an axial bore formed in the casing 21 and the braking liquid path 4 which is connected with this axial bore. In this manner, a braking liquid is introduced into the first pressure chamber 23, allowing the braking liquid pressure which is generated by the master cylinder 3 to operate on it.

The stepped piston 22 also includes a small diameter portion 22c having an end face 22d, which defines a second pressure chamber 24 together with an opposing wall surface of the casing 21 and the wall surface of the stepped bore 21A which defines a small diameter bore 21b. The second pressure chamber 24 communicates with front wheel cylinders 5 through an axial bore formed in the casing 21 and its connected braking liquid path 4, whereby the braking liquid pressure of the front wheel cylinders 5 act upon the second pressure chamber 24.

The stepped piston 22 also includes a stepped end face 22e, which defines a third pressure chamber 25 together with an opposing stepped wall surface of the stepped bore 21A and the wall surface of the large diameter bore 21a. The third pressure chamber 25 communicates with the accumulator 12 through a radial path 21c formed in the casing 21 and the braking liquid path 16 which is connected thereto, thus allowing the liquid pressure from the accumulator 12 to be introduced into the third pressure chamber 25.

A return spring 26 is disposed between the stepped wall surface of the stepped bore 21A and the stepped end face 22e of the stepped piston 22 to position the stepped piston 22 at its inoperative position, shown, where its end face 22b abuts against the opposing wall surface of the casing 21.

A communication path 22f axially extends through the stepped piston 22, and provides a communication between the first pressure chamber 23 and the second pressure chamber 24.

A stepped bore 22g is formed in the axial portion of the stepped piston 22, and a valve member 27 including a large diameter portion 27a at its axially median position thereon is slidably fitted in the stepped bore 22g. One end 27b of the valve member 27 faces the second pressure chamber 24 while the other end 27c of the valve member 27 is located within the communication path 22f. A ball is embedded in the end face of the other end 27c of the valve member 27 in a region which is located within the communication path 22f, the ball defining a seat 27d. A valve seat 28 is formed in opposing relationship with the seat 27d, and the seat 27d is capable of moving toward or away from the valve seat 28. The combination of the seat 27d and the valve seat 28 defines an open/close valve 29 which opens or closes the communication path 22f. It is to be noted that the opposite ends 27b, 27c of the valve member 27 have an equal cross-sectional area d1, d2, while the seat 27d which is adapted to be seated upon the valve seat 28 has a cross-sectional area which is less than the cross-sectional area d1 of the end 27c.

The interior of the stepped bore 22g is defined as a spring chamber 31 in a region which is displaced toward the second pressure chamber 24 than the large diameter portion 27a of the valve member 27. A spring 32 which is set to a given load is disposed within the spring chamber 31, thus urging the valve member 27 upward to close the open/close valve 29. The spring chamber 31 communicates with the atmosphere through a path 22h formed to extend through the stepped piston 22 and through a path 21d formed in the casing 21. Alternatively, the spring chamber 31 may communicate with the reservoir 14 rather than communicating to the atmosphere.

A fourth pressure chamber 33 is defined within the interior defined by the stepped bore 22g in a region displaced toward the first pressure chamber 23 than the large diameter portion 27a, and communicates with the third pressure chamber 25 through a path 22i formed to extend through the stepped piston 22. Accordingly, the pressure from the accumulator 12 is normally maintained within the fourth pressure chamber 33, thus urging the valve member 27 downward against the resilience of the spring 32 and maintaining the open/close valve 29 in its open condition.

In the present embodiment, the communication path 22f, valve member 27, open/close valve 29, spring 32 and fourth pressure chamber 33 formed or disposed in the stepped piston 22 constitute together the control valve 8.

In operation, when the liquid pressure booster 2 as well as the accumulator 12 and the pump 13, which represent a source of liquid pressure associated with the booster, are normally operating, the liquid pressure from the accumulator 12 acts upon the fourth pressure chamber 33, whereby the spring 32 is compressed to maintain the valve 29 open. Under this condition, the valve member 27 is urged downward as governed only by the relationship between the pressure from the accumulator 12 which acts upon the fourth pressure chamber 33 to urge the valve member downward and the resilience of the spring 32, since the opposite ends 27b, 27c of the valve member 27 have equal cross-sectional areas d1, d2. Accordingly, the valve 29 is open, whereby the first pressure chamber 23 and the second pressure chamber 24 communicate with each other through the communication path 22f. Also, a communication is established between the master cylinder 3 and the front wheel cylinders 5. The stepped piston 22 is located at its inoperative position, shown, by the return spring 26.

When the brake pedal 1 is depressed under this condition, the booster 2 boosts the force with which the Brake pedal 1 is depressed at a given ratio before it is transmitted to the master cylinder 3. This causes a braking liquid pressure to be generated in the master cylinder 3. This pressure is transmitted to the front wheel cylinders 5 through the braking liquid path 4 located upstream of the intensifier mechanism 7, the first pressure chamber 23, the communication path 22f and the second pressure chamber 24 of the intensifier mechanism 7, and through the braking liquid path 4 located downstream of the intensifier mechanism 7, thus actuating the brake in a normal manner.

It will be seen that the valve 29 remains open if the brake pedal 1 continues to be depressed after the booster ratio of the booster 2 has reached a full load point of 1. Accordingly, the master cylinder 3 maintains its communication with the front wheel cylinders 5 through the braking liquid path 4 and the intensifier mechanism 7. Accordingly, if the stepped piston 22 is displaced downward from its inoperative position, shown, by compressing the return spring 26, the intensifier mechanism 7 cannot be actuated.

By contrast, in the event the accumulator 12 and the pump 13, acting as a source of liquid pressure, fail and the booster function by the booster 2 is no longer available, the liquid pressure from the accumulator 12 which acts upon the third pressure chamber 25 and the fourth pressure chamber 33 will be reduced to zero or so.

As a consequence, the resilience of the, spring 32 which urges the valve member 27 upward overcomes the liquid pressure from the accumulator 12, which has been acting upon the fourth pressure chamber 33 to urge the valve member 27 downward, and accordingly, the valve member 27 will be driven upward relative to the stepped piston 22, causing the seat 27b to be seated upon the valve seat 28 to close the valve 29. In this manner, a communication between the master cylinder 3 and the front wheel cylinders 5 is interrupted.

When the brake pedal 1 is depressed under this condition, it will be noted that a booster function by the booster 2 is no longer available, and hence the force with which the brake pedal 1 is depressed is directly transmitted to the master cylinder 3. This causes the braking liquid pressure to be generated in a booster 2 which acts upon the first pressure chamber 23 of the intensifier mechanism 7. In response thereto, the stepped piston 22 is forced down against the resilience of the return spring 26, and this brings forth the effect that the braking liquid pressure in the second pressure chamber 4 is intensified by an amount corresponding to the ratio of the cross-sectional area of the small diameter portion 22c to the cross-sectional area of the large diameter portion 22a of the stepped piston. 22, the intensified braking liquid pressure being transmitted to the front wheel cylinders.

As discussed, in the present embodiment, in the event the source of liquid pressure associated booster 2 fails and the intensifier function by the booster 2 is no longer available, the liquid pressure from the accumulator 12 which acts upon the fourth pressure chamber 33 is reduced. This allows the open/close valve 29 to be closed under the resilience of the spring 32. Subsequently, when the brake pedal 1 is depressed, the intensifier mechanism 7 is actuated immediately. In this manner, an operational lag of the intensifier mechanism 7 upon failure or sinking of the booster 2 can be prevented.

If the booster 2 reached its full load point during its normal operation, the open/close valve 29 remains open, preventing the intensifier mechanism 7 from affording an intensifier action. Accordingly, in the present-embodiment, there is no need to provide a limiter in the braking liquid path 16 which is effective to prevent an intensifying action of the intensifier mechanism 7 after the booster 2 has reached its full load point.

SECOND EMBODIMENT

Figure 3:
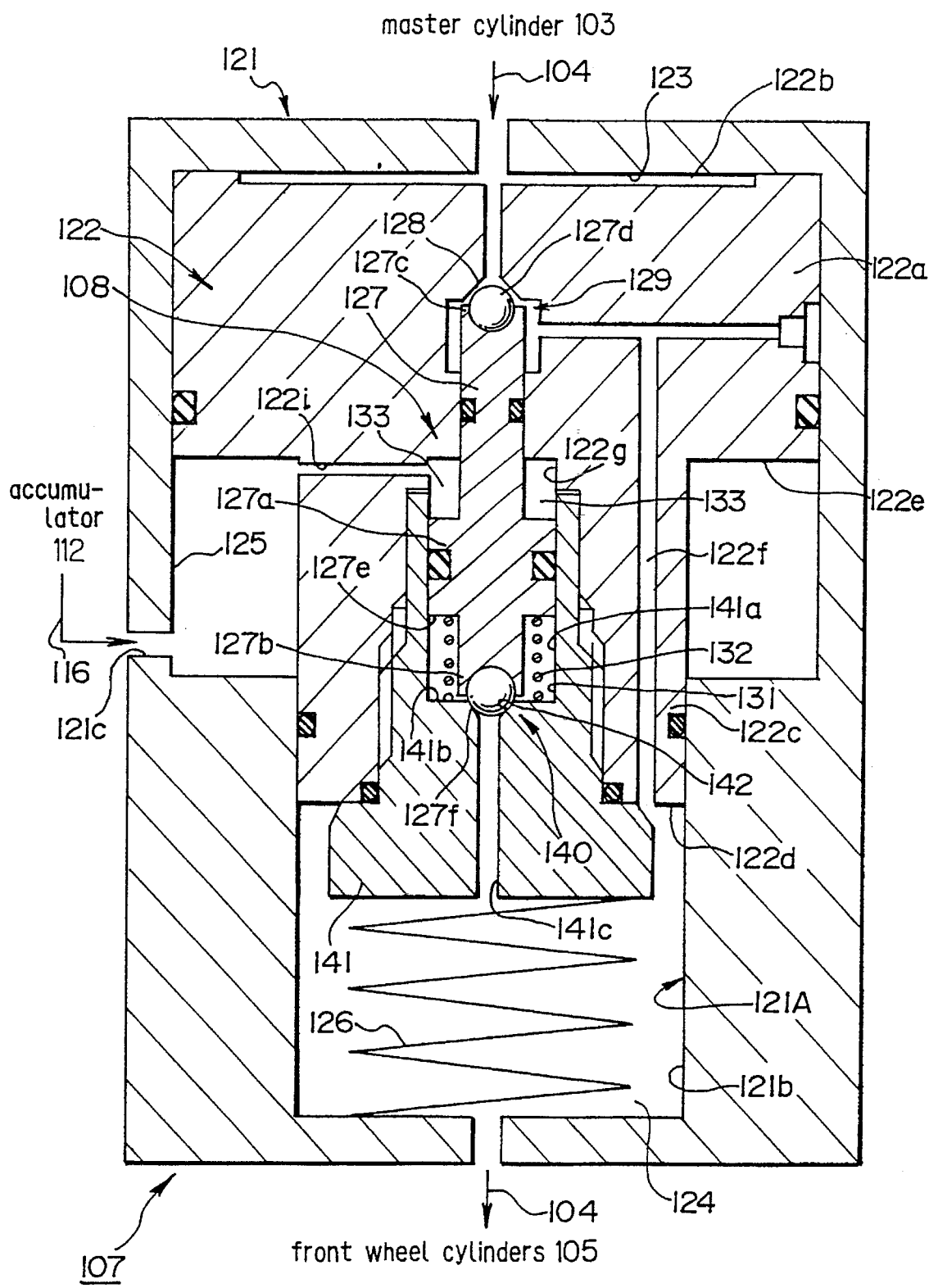
FIG. 3 is a cross section of a second embodiment of the invention.

FIG. 3 shows a second embodiment of the invention. In contrast to the first embodiment in which a spring chamber 31 is open to the atmosphere or the reservoir 14, in the second embodiment, a spring chamber 131 is caused to communicate with a second pressure chamber 124 through a second open/close valve 140.

Specifically, in the second embodiment, a stepped piston 122 includes a small diameter portion 122c, in the axial portion of which is threadably engaged with a plug 141 having a stepped, axial through-bore formed therein. The entire assembly including the plug 141 is referred to as the stepped piston 122. The through-bore in the plug 141 includes a large diameter bore 141a in which a large diameter portion 127a of a valve member 127 is fitted. Bore 141a defines a fourth pressure chamber 133 on the side of the large diameter portion 127a which is located toward a first pressure chamber 123, generally in the similar manner as described above in connection with the first embodiment. At a location below the large diameter portion 127a, the valve member 127 includes a stepped end face 127e, which defines a spring chamber 131 together with an opposing stepped end face 141b of the plug 141 and the wall surface of the large diameter bore 141a. A spring 132 tensioned to a preset load is disposed between the both stepped end faces 127e and 141b to urge the valve member 127 upward.

The valve member 127 includes an end 127b located within the spring chamber 131 and which has an end face, in which a ball is embedded to form a seat 127f. This ball is of the same diameter as the diameter of the other ball which is used to form an other open/close valve 129. The plug 141 includes a small diameter bore 141c which is contiguous to the large diameter bore 141a. At a boundary between the both bores 141a and 141c, a valve seat 142 is formed thereon so as to be located opposite to the seat 127f to permit the latter to move toward or away therefrom. The combination of the seat 127f and the valve seat 142 defines a second open/close valve 140.

The opposite ends 127b, 127c of the valve member 127 have an equal cross-sectional area, and the both seats 127b, 127f also have an equal cross-sectional area.

In this embodiment, a return spring 126 is disposed within a second pressure chamber 124.

In other respects, the arrangement is similar to that of the first embodiment, and accordingly, corresponding parts are designated by like numerals as used before in the description of the first embodiment, to which 100 is added.

In operation, when a liquid pressure booster and an associated source of liquid pressure such as accumulator 112 are operating in a normal manner, a liquid pressure from an accumulator 112 acts on the fourth pressure chamber 133, whereby the spring 132 is compressed to close the valve 140 while the other valve 129 is open. The stepped piston 122 is positioned at its inoperative position, shown, by the return spring 126.

When the brake pedal is depressed under this condition, the liquid pressure booster boosts a force with which the brake pedal is depressed at a given ratio before it is transmitted to a master cylinder 103, and the braking liquid pressure generated therein is transmitted to front wheel cylinders without being intensified by an intensifier mechanism 107. Thus, a normal braking operation takes place.

If the brake pedal continues to be depressed after the booster ratio of the liquid pressure booster has reached its full load point of 1, the valve 129 remains open, and hence, if the stepped piston 122 compresses the return spring 126 to slide downward within the stepped bore 121A, there cannot occur an actuation of the booster mechanism 107.

However, when the accumulator 112 and an associated pump, acting as a source of liquid pressure, fail and a booster function by the liquid pressure booster is no longer available, the liquid pressure from the accumulator 112 which acts on the third pressure chamber 125 and the fourth pressure chamber 133 will be reduced to zero or so.

Accordingly, the resilience of the spring 132 which urges the valve member 127 upward exceeds the effect of the liquid pressure from the accumulator 112 which has been depressing the valve member 127, and accordingly, the valve member 127 is driven upward against the stepped piston 122, allowing the seat 127d to be seated on the valve seat 128 to close the valve 129, while opening the second open/close valve 140.

As a consequence, a communication between the first pressure chamber 123 and a second pressure chamber 124 is interrupted, as is a communication between the master cylinder 103 and front wheel cylinders 105. The opening of the second valve 140 allows a communication between the spring chamber 131 and the second pressure chamber 124, whereby the liquid pressure in the second pressure chamber 124 (or the liquid pressure in the front wheel cylinders 105) acts on the valve member 127. Consequently, the valve member 127 is subjected not only to the resilience of the spring 132, but also to the liquid pressure from the third pressure chamber 125, whereby the open/close valve 129 is closed in a reliable manner.

When the brake pedal is depressed under this condition, the braking liquid pressure from the master cylinder 103 is intensified by the intensifier mechanism 107 for transmission to the front wheel cylinders 105, in the similar manner as described above in connection with the first embodiment. Accordingly, a similar functioning and effects are achieved as in the previous embodiment.

THIRD EMBODIMENT

Figure 4:
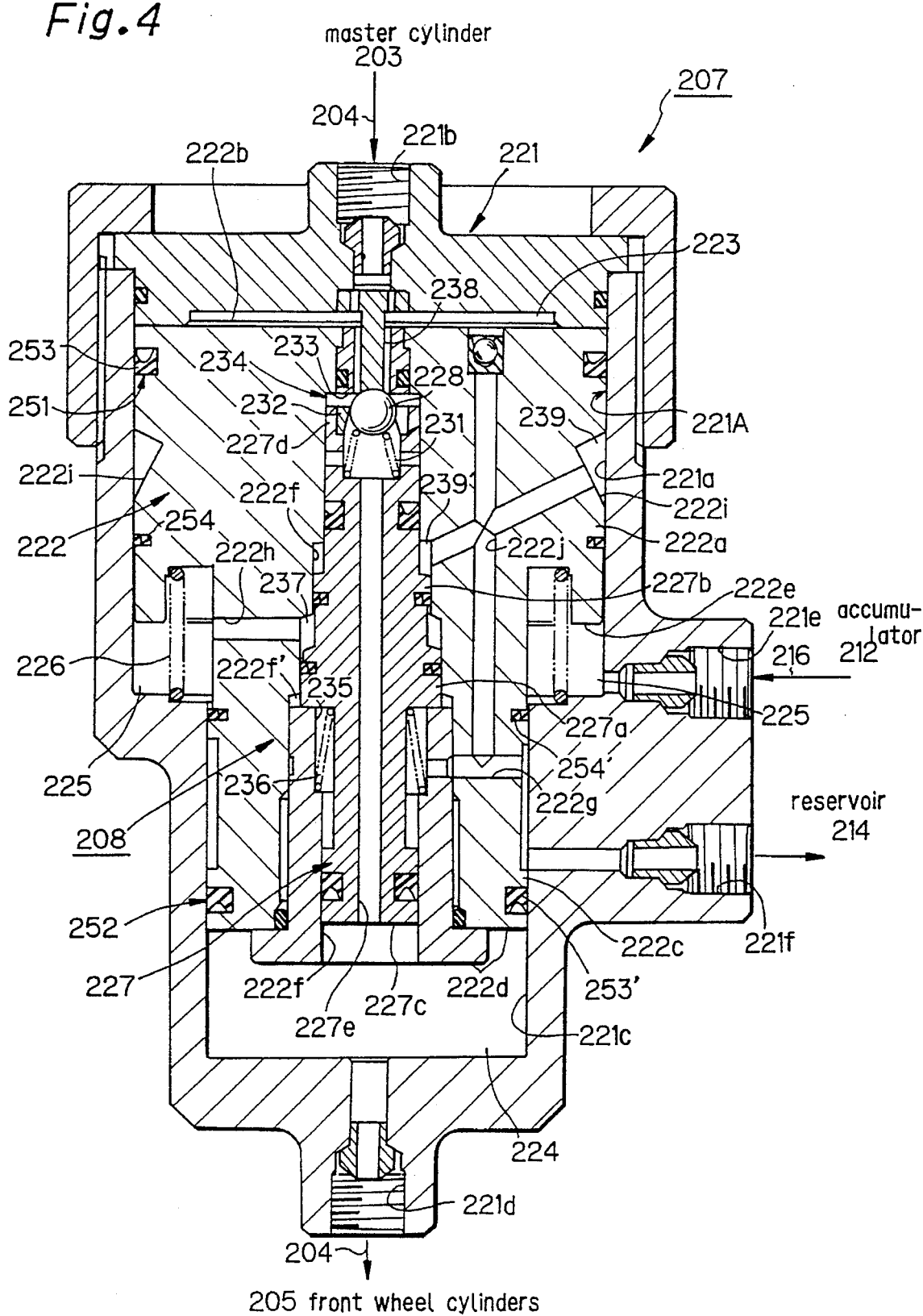
FIG. 4 is a cross section of a third embodiment of the invention.

FIG. 4 shows a third embodiment of the invention. Briefly, in the third embodiment, the communication path 22f shown in the first embodiment indicated in FIG. 2 is formed in the axial portion of the valve member 27, together with concomittant improvements.

Specifically, a sliding member 227, which corresponds to valve member 27 in the first embodiment, includes a large diameter portion 227a toward its center, as viewed in the axial direction thereof, and also includes a medium diameter portion 227b immediately above the large diameter portion 227a. Opposite ends of the sliding member 227 have an equal diameter which is less than that of the medium diameter portion 227b. The lower portion of the sliding member 227 is disposed in a communication channel 222f formed in the axial portion of a stepped piston 222, and the bottom end 227c of the sliding member 227 faces a second pressure chamber 224. The top end 227d of the sliding member 227 extends through the communication path 222f to face a first pressure chamber 223.

A communication path 227e axially extends through the sliding member 227 in alignment with the axis thereof, and has its diameter increased at its top end which faces the first pressure chamber 223. A spherical valve element 228 is received in the top portion of the path 227e having an increased diameter so that the valve element 228 is vertically movable. A first spring 231 is disposed in this top end to urge the valve element 228 in a direction away from the communication path 222f (or toward the first pressure chamber 223).

An arcuate stop member 232 is fitted around the inner periphery of the top end of the communication path 227e having an increased diameter. The inner periphery of the stop member 232 is tapered so that its diameter decreases toward the top end. Accordingly, the valve element 228 which is urged upward by the first spring 231 is urged into abutment against the inner periphery of the stop member 232, thus preventing its disengagement and restricting a seat portion thereof which is located above the stop member to a given elevation. If the valve element 228 abuts against the inner periphery of the stop member 232, an axial clearance formed in the stop member 232 allows a communication between the communication path 222f, at a location immediately adjacent to the valve element 228, and the second pressure chamber 224 through the communication path 227e. In this manner, the stop member 232 functions to prevent the projection of the valve element 228 from the communication path 227e beyond a given amount and to maintain a communication across the stop member 232.

At a location opposite to the valve element 228, the communication path 222f is formed with a step, the inner peripheral surface of which defines an annular valve seat 233 which may be engaged by the valve element 228. In this manner, an open/close valve 234 is defined by the valve element 228 and the valve seat 233 to open or close the communication path 222f.

A spring chamber 235 is defined within the communication path 222f at a location displaced from the large diameter portion 227a of the sliding member 227 toward the second pressure chamber 224, and a second spring 236 which is tensioned to a preset load is disposed within the spring chamber 235. The resilience of the second spring 236 normally urges the sliding member 227 upward within the communication path 222f.

The spring chamber 235 communicates with a reservoir 214 through a path 222g formed in the stepped piston 222, a path 221f formed in a casing 221, and through a braking liquid path, not shown, which is connected to the path 221f. Alternatively, the spring chamber 235 may be open to the atmosphere rather than making it to communicate with the reservoir 214.

A fourth pressure chamber 237 is defined above the large diameter portion 227a of the sliding member 227, and communicates with a third pressure chamber 225 through a path 222h formed in the stepped piston 222. Consequently, a liquid pressure from an accumulator 212 acts on the fourth pressure chamber 237. This causes the sliding member 227 to be urged downward within the communication path 222f against the resilience of the second spring 236, and comes to a stop at its inoperative position, shown, where the lower stepped end face of the large diameter portion 227a abuts against an opposing stepped end face 222f of the communication path 222f.

When the sliding member 227 remains stationary at its inoperative position under the action of the liquid pressure in the fourth pressure chamber 237, the seat of the valve element 228 urged by the first spring 231 which projects above the stop member 232 tends to be seated upon the valve seat 233. Accordingly, in the present embodiment, one end of a pin-shaped engaging member 238 is fitted in a path 221b formed in the casing 221 in a region of the first pressure chamber 223 so that the engaging member 238 lies in the first pressure chamber 223 with its distal end located opposite to the valve element 228. When the stepped piston 222 assumes its inoperative position, shown, the distal end of the engaging member 238 extends into the communication path 222f from above to abut against the valve element 228. This action forces forcing the valve element 228 down against the resilience of the first spring 231 to open the valve 234. It is to be noted that said one end of the engaging member 238 which is fitted in the path 221b is formed with a plurality of axially extending bores to permit a flow of the braking liquid from the master cylinder 203. In this manner, in the operative position shown, the first pressure chamber 223 and the second pressure chamber 224 communicate to each other, and a communication is established between the master cylinder 203 and front wheel cylinders 205.

In addition, in the third embodiment, the large diameter portion 222a of the stepped piston 222 is formed with an annular groove 222i, which defines a reservoir 239 for braking liquid together with the inner wall surface of the large diameter bore 221a. Another reservoir 239' is formed as an annular space immediately above the medium diameter portion 227b of the sliding member 227. Reservoirs 239, 239' communicate with each other through a recovery path 222j formed in the stepped piston 222, and also communicate with the path 222g which in turn communicates with the reservoir 214. In this manner, any residue of braking liquid which remains in the sliding portion of the large diameter portion 222a of the stepped piston 222 is temporarily stored in the reservoir 239', and subsequently the braking liquid in these reservoirs 239, 239' are recovered to the reservoir 214 through the recovery passage 222j, the path 222g and the like. In this manner, a loss of braking liquid can be prevented.

A communication between the both reservoirs 239, 239' and the reservoir 214 is established by the recovery passage 222j which extends both vertically and substantially radially within the stepped piston 222. However, alternatively, a path which allows the communication between reservoirs 239, 239' may be formed within the stepped piston 222, and another path which allows a communication between the reservoir 239 and the path 221f formed in the casing 221 may be formed within the casing 221. This dispenses with the formation of a vertical path within the stepped piston 222, allowing a reduction in the size of the stepped piston 222, and hence of a booster mechanism 207.

Finally, in the third embodiment, seal means 251 and 252 maintans a liquid tightness between the stepped piston 222 and a stepped bore 221A formed in the casing 221 is constructed as follows: seal means 251 provided on the large diameter portion 222a of the stepped piston 222 for maintaining a liquid tightness between the large diameter portion 222a and the large diameter bore 221a comprises an annular, first seal member 253 mounted around the outer peripheral surface of the large diameter portion 222a at a location displaced from the annular groove 222i toward the first pressure chamber 223, and an annular. A second seal member 254 is mounted around the outer peripheral surface of the large diameter portion at a location displaced from the annular groove 222i toward the third pressure chamber 225. The first seal member 253 is formed of rubber, and is cup-shaped in section. On the other hand, the second seal member 254 contains an O-ring on the inside, the outside of which is covered by a Teflon ring.

Seal means 252 which is provided on the small diameter portion 222c of the stepped piston 222 for maintaining a liquid tightness between the small diameter portion 222c and the small diameter bore 221c comprises, an annular, first seal member 253' mounted around the outer peripheral surface of the small diameter portion 222c at a location displaced from the path 222g toward the second pressure chamber 224. Seal mean 252 also includes an annular, second seal member 254' mounted around the outer peripheral surface of the small diameter portion 222c at a location displaced from the path 222g toward the third pressure chamber 225. The first seal member 253' is made of rubber and is cup-shaped in section, in the similar manner as the first seal member 253, and the second seal member 254 contains an O-ring on the inside, the outside of which is covered by a Teflon ring, in the similar manner as the second seal member 254.

The operation of the third embodiment mentioned above will now be described. When the liquid pressure booster, the accumulator 212 and the pump are all operating in a normal manner, the liquid pressure from the accumulator 212 operates on the third pressure chamber 225 and the fourth pressure chamber 237 to compress the second spring 236. Accordingly, the sliding member 227 assumes its inoperative position, shown, where the stepped end face of the large diameter portion 227a abuts against the stepped end face 222f of the communication path 222f. The stepped piston 222 is located at its-inoperative position, shown, by the resilience of the return spring 226. Accordingly, the valve element 228 which is located at the top end of the sliding member 227 abuts against the distal end of the engaging member 238 and hence is depressed, thus making the valve 234 open.

When the brake pedal is depressed under this inoperative condition, the liquid pressure booster boosts a force with which the brake pedal is depressed at a given ratio before it is transmitted to the master cylinder 203. A braking liquid pressure is generated within the master cylinder 203 and acts on the first pressure chamber 223 of the intensifier mechanism 207. Since the valve 234 is open at this time, the intensifier mechanism 207 is not actuated, and the liquid pressure acting in the first pressure chamber 223 is conveyed to the second pressure chamber 224 through the communication paths 222f, 227e, and thence fed to the front wheel cylinders 205. In this manner, a normal braking operation takes place.

When the brake pedal continues to be depressed after the booster ratio of the liquid pressure booster has reached its full load point of 1 under the normal condition of the booster and its associated source of liquid pressure, the liquid pressure in the accumulator 212 which acts upon the third pressure chamber 225 remains constant while the liquid pressure in the master cylinder 203 which acts upon the first pressure chamber 223 rises and exceeds the level of the liquid pressure within the third pressure chamber 225. Accordingly, the stepped piston 222 will be driven downward from its inoperative position, shown, against the resilience of the return spring 226.

Concomitantly, the valve element 228 which then moves downward, moves away from the distal end of the engaging member 238. However, because the fourth pressure chamber 237 is subject to the action of the liquid pressure from the accumulator 212, the sliding member 227 remains at rest within the communication path 222f while maintaining its inoperative position shown. On the other hand, the valve element 228 which is urged by the first spring 231, the amount of projection of which in the outward direction is constrained by abutment against the stop member 232, will be removed from the valve seat 233 to open the valve 234. Accordingly, subsequent to the full load point of the liquid pressure booster, the intensifier mechanism 207 cannot be actuated, and hence an intensifying action thereof is unavailable despite the stepped piston 222 moves downward from its inoperative position shown.

In this-manner, it will be seen that in the third embodiment, the intensifier mechanism 207 is not actuated when the liquid pressure in the master cylinder 203 rises above the liquid pressures of the third pressure chamber 225 and the fourth pressure chamber 237 subsequent to the full load point. Accordingly, there is no need to provide a limiter in the braking liquid path 216 in order to prevent the intensifier mechanism 207 from being actuated subsequent to the full load point, thus simplifying the arrangement.

In contrast to the normal operation mentioned above, when the accumulator 212 and the pump, which represent the source of liquid pressure associated with the booster, fail and a booster action by the liquid pressure booster is no longer available, the liquid pressure in the accumulator 212 which acts upon the third pressure chamber 225 and the fourth pressure chamber 237 will be reduced to zero or so. Accordingly, the resilience of the second spring 236 which urges the sliding member 227 upward overcomes the liquid pressure from the accumulator 212 which has been acting upon the fourth pressure chamber 237 to depress the sliding member 227. Hence, the sliding member 227 will rise upward from its inoperative position shown, but since the stepped piston 222 is in its inoperative position shown at this time, the valve element 228 stays in abutment against the distal end of the engaging member 238, thus opening the valve 234.

When the brake pedal is now depressed, the absence of the booster action from the liquid pressure booster causes the force with which the brake pedal has been depressed to be directly transmitted to the master cylinder 203 without experiencing a booster action by the booster. The liquid pressure in the master cylinder 203 then rises, and acts upon the first pressure chamber 223 in the intensifier mechanism 207.

When the liquid pressure from the master cylinder 203 acts upon the first pressure chamber 223, the stepped piston 222 is driven downward from its inoperative position, shown, against the resilience of the return spring 226 since the liquid pressure in the third pressure chamber 225 is equal to zero. Thus the valve element 228 moves away from the distal end of the engaging member 238. Subsequently, since the sliding member 227 is raised by the second spring 236 and the valve element 228 is urged upward by the first spring 231, the seat of the valve 228 which projects above the stop member 237 becomes seated upon the valve seat 233 to close the valve 234.

This interrupts a communication between the master cylinder 203 and the front wheel cylinders 205. In the present embodiment, if a failure of the accumulator 212 has already occurred at the time the brake pedal is depressed, there is a slight time lag from the commencement of depression of the brake pedal to the closure of the valve 234. During this time interval, an amount of braking liquid which corresponds to a lost motion of the front wheel cylinders 205 can be supplied to these cylinders 205. In the event a failure of the accumulator 212 occurs after the brake pedal 1 is depressed under a normal condition of the accumulator 212 to provide a normal braking operation, the valve 234 is closed in the manner mentioned above. However, during a short time lag which occurs from the time when the third pressure chamber 225 falls to a liquid pressure of zero to the closure of the valve 234, the braking liquid in the second pressure chamber 224 flows into the first pressure chamber 223 through the communication paths 222f, 227e. In this manner, the braking liquid of a high liquid pressure is prevented from remaining within the braking liquid path 204 leading to the front wheel cylinders 205, thus preventing a dragging of the brake.

Subsequent to the closure of the valve 234, as the brake pedal continues to be depressed, the stepped piston 222 will be driven downward against the resilience of the return spring 226, and the braking liquid pressure in the second pressure chamber 224 will be intensified by an amount corresponding to the ratio of the cross-sectional area of the small diameter portion 222c to the cross-sectional area of the large diameter portion 222a of the stepped piston 222 to be transmitted to the front wheel cylinders 205.

When the brake pedal is released, the liquid pressure in the master cylinder 203 reduces, and accordingly, the stepped piston 222 is returned to its inoperative position shown under the resilience of the return spring 226. The valve element 228 will then abuts against the engaging member 238 to open the valve 234.

According to the third embodiment described above, if the liquid pressure booster has reached its full load point under the normal condition, the intensifying action by the intensifier mechanism 207 is not available since the valve 234 thereof is opened. This avoids a need for the provision of a limiter in the braking liquid path 216 for preventing a intensifying action by the intensifier mechanism 207 after the liquid pressure booster has reached its full load point. In addition, the braking liquid path 204 extending between the second pressure chamber 224 and the front wheel cylinders 205 may be designed to present a low pressure withstanding capability.

In addition, in this embodiment, the seal means 251, 252 mounted on the stepped piston 222 each comprises pairs of seal members 253, 254, and 253', 254', which provides an additional advantage. Specifically, if the first seal member 253 of the seal means 251 fails to maintain a liquid tightness, the braking liquid from the first pressure chamber 223 will leak to the reservoir 239 through the failing portion of the first seal member 253, and thence to the reservoir 204 through the recovery path 222j or the like. However, the liquid pressure from the accumulator 212 which is acting upon the third pressure chamber 225 can be maintained at its normal value since the liquid tightness is maintained by the second seal member 254, thus securing a normal booster action of the liquid pressure booster. Accordingly, in the event the first seal member 253 for the intensifier mechanism 207 associated with the front wheels fails, the liquid pressure booster still operates in a normal manner when the brake is operated, assuring a normal operation of the brake associated with the rear wheels. The same applies when the first seal member 253' of the seal means 252 mounted around the small diameter portion 222c should fail. Specifically, when the first seal member 253' fails to maintain the liquid tightness, the braking liquid within the second pressure chamber 224 will leak to the recovery path 222g through the failing portion of the first seal member 253', and thence to the reservoir 214 through the path 221f or the like. However, the other or second seal member 254' maintains the liquid tightness, whereby the liquid pressure from the accumulator 212 which is acting upon the third pressure chamber 225 is maintained at its normal value, assuring a normal booster action of the liquid pressure booster 2.

On the other hand, if the second seal member 254 of the seal means 251 fails to maintain the liquid tightness, the braking liquid which is introduced into the third pressure chamber 225 will leak to the reservoir 239 through the failing portion of the second seal member 254, and thence to the reservoir 214 through the recovery path 222*j* or the like. Accordingly, the liquid pressure in the accumulator 212 will be reduced to degrade the booster function of the liquid pressure booster, but the other or first seal member 253 maintains the liquid tightness, thus assuring a normal intensifying function of the intensifier mechanism 207. Accordingly, if the second seal member 254 of the intensifier mechanism 207 associated with the front wheels, for example, fail, the booster function of the liquid pressure booster will be reduced upon operation of the brake, but the intensifier mechanism 207 associated with the front and the rear wheels operate in a normal manner, and the braking liquid pressure produced by the master cylinder 203 is intensified by the intensifier mechanism 207 to be transmitted to the front and the rear wheel cylinders. The same applies when the second seal member 254' of the seal means 252 mounted around the small diameter portion 222*c* should fail. Thus, if the second seal member 254' fails to maintain the liquid tightness, the braking liquid within the third pressure chamber 225 will leak to the recovery path 222*g* through the failing portion of the second seal member 254, and thence to the reservoir 214 through the path 221*f* or the like, thus degrading the booster function of the liquid pressure booster. However, since the other or first seal member 253 maintains the liquid tightness, the intensifier mechanism 207 will operate in a normal manner.

The effect of providing seal means 251, 252 has been described above in connection with an embodiment in which the liquid pressure from the accumulator 212 is acting upon the third pressure chamber 225, but a similar effect can be obtained when the liquid pressure from the power chamber of the liquid pressure booster is acting upon the third pressure chamber 225.

FOURTH EMBODIMENT

Figure 5:
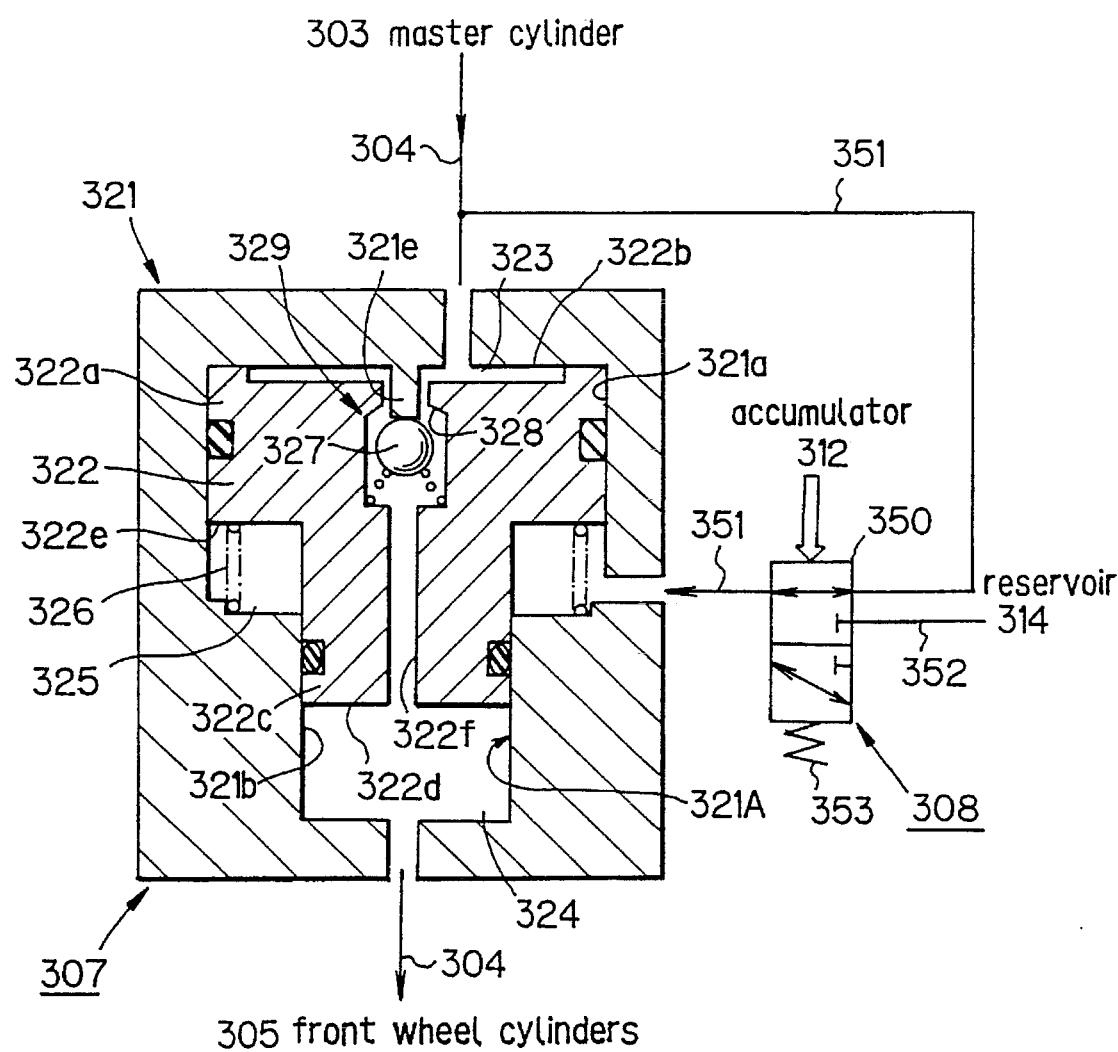
FIG. 5 is a cross section of a fourth embodiment of the invention.

FIG. 5 shows a fourth embodiment of the invention. In each embodiment described above, the control valve 8 (108, 208) is assembled into the stepped piston 22 (122, 222). However, in the fourth embodiment, a switching valve 350, which forms part of a control valve 308, is disposed outside a casing 321.

Specifically, in the fourth embodiment, a single stepped through-bore 322*f* is formed in the axial portion of a stepped piston 322 and serves as a communication path between a first pressure chamber 323 and a second pressure chamber 324. The bore 322*f* has a portion of an increased diameter which contains a spherical valve element 327, and a valve sleeve 328 is disposed in opposing relationship therewith, the valve element 327 moving toward and away from the valve sleeve to define an open/close valve 329. A projection 321*e* is formed on the wall surface of the casing 321 which faces the first pressure chamber 323, with the distal end of the projection 321*e* being disposed opposite to the valve element 327.

When an intensifier mechanism 307 is inoperative, an end face 322*b* of a large diameter portion 322*a* of the stepped piston 322 abuts against the wall surface of the casing 321 under the resilience of a return spring 326, whereby the distal end of the projection 321*e* extends through the valve seat 328 to keep the valve element 327 removed from the valve seat 328. Thus, the valve 329 is opened providing a communication between a master cylinder 303 and front wheel cylinders 305.

In the fourth embodiment, a liquid pressure from the master cylinder 303 is introduced into a third pressure chamber 325 through a braking liquid path 351, which is in turn connected to an end of a braking liquid path 352 communicating with a reservoir 314 through the switching valve 350. Alternatively, an accumulator 312 may be connected to the braking liquid path 352, instead of the reservoir 314, or a liquid pressure booster may be connected in turn. Rather than introducing the liquid pressure from the master cylinder 303 into the third pressure chamber 325, the liquid pressure from the front wheel cylinders 305 may be introduced into the third pressure chamber 325.

The switching valve 350 is slidably disposed in a housing, not shown, and is urged upward by a spring 353 which is tensioned to a preset load while the liquid pressure from the accumulator 312 which is introduced into the housing urges the valve in the opposite direction from the spring 353.

In this embodiment, a combination of the through-bore 322*f* in the stepped piston 322, the valve 329 and the switching valve 350 forms a control valve 308.

In other respects, the arrangement is similar to that of the first mentioned embodiment, and accordingly corresponding parts are designated by like numerals as used before, to which 300 is added, while omitting their description.

Describing the operation of the fourth embodiment, when the liquid pressure booster and its associated source of liquid pressure, namely, the accumulator 312 or the like, are operating in a normal manner, the liquid pressure from the accumulator 312 acts on the switching valve 350 to compress the spring 353 as shown in FIG. 5. Accordingly, the liquid pressure from the master cylinder 303 is introduced into the third pressure chamber 325 through the braking liquid path 351 and the switching valve 350, in addition to the first pressure chamber 323 and the second pressure chamber 324.

Under this condition, the upside and the downside of the stepped piston 322 is subject to the same pressure, namely, the liquid pressure from the master cylinder 303, and accordingly, the stepped piston 322 is in its inoperative position shown, and the valve 329 is open. Hence, a communication is established between the master cylinder 303 and the front wheel cylinders 305, and when a brake pedal is depressed under this condition, a normal brake operation takes place.

In contrast to the normal condition mentioned above, when the accumulator 312 and the associated pump, which represents a source of liquid pressure, fail and a booster action by the liquid pressure booster is no longer available, the liquid pressure from the accumulator 312 which acts upon the switching valve 350 will be reduced to zero or so, whereby the resilience of the spring 353 exceeds the depressing action of the liquid pressure, thus switching a flow path in the switching valve 350. As a consequence, a communication between the third pressure chamber 325 and the master cylinder 303 is interrupted, while a communication is established between the third pressure chamber 325 and the reservoir 314, reducing the liquid pressure within the fourth pressure chamber 325 to zero.

Accordingly, the stepped piston 322 is driven downward against the resilience of the return spring 326 under the influence of the liquid pressure from the master cylinder 303 which acts upon the first pressure chamber 323, and simultaneously the valve element 327 will be removed from the distal end of the projection 321*e* and will be seated upon the valve seat 328 to close the valve 329. This interrupts a communication between the first pressure chamber 323 and the second pressure chamber 324, and hence also a communication between the master cylinder 303 and the front wheel cylinders 305. Accordingly, if the brake pedal is now depressed, the braking liquid pressure from the master cylinder 303 will be intensified by the intensifier mechanism 307 to be transmitted to the front wheel cylinders 305 in the same manner as mentioned previously in connection with the first embodiment. The described arrangement of the fourth embodiment achieves the similar functioning and effects as achieved by the first and the second embodiment.

In the first and the second embodiment, the liquid pressure from the accumulator 12 or 112 is introduced into the fourth pressure chamber 33 or 133 through the third pressure chamber 25 or 125, but instead of the liquid pressure from the accumulator, the liquid pressure from the liquid pressure booster may be introduced into the such pressure chamber. Also, in the fourth embodiment, the liquid pressure from the accumulator 312 which is chosen to act upon the switching valve 350 may be replaced by the liquid pressure from the liquid pressure booster.

In such instance, a preset load upon the spring 32, 132 or 353 is reduced than the load chosen when introducing the liquid pressure from the accumulator so that the control valve 8, 108 or 308 is maintained in its inoperative position by the pressure in the power chamber which prevails immediately after the commencement of the booster action by the liquid pressure booster. Accordingly, when the liquid pressure booster is inoperative, the control valve 8, 108 or 103 is in its operative position, but during a normal operation, as soon as the liquid pressure booster operates, the liquid pressure in the power chamber is introduced into the third pressure chamber 25, 125 and the fourth pressure chamber 33, 133 in the first and the second embodiment. Consequently, the control valve 8 or 108 moves to its inoperative position, closing the valve 29 or 129, which prevents the intensifier mechanism 7 or 107 from being actuated. In the fourth embodiment, the switching valve 350 is switched to introduce the master cylinder pressure or the wheel cylinder pressure into the third pressure chamber 325, again preventing an actuation of the intensifier mechanism 307. If the source of liquid pressure fails and the accumulator pressure becomes equal to zero, the liquid pressure in the power chamber will be zero if the liquid pressure booster operates, and since the control valve 8, 108 or 308 remains in its operative position, the intensifier mechanism is actuated in each of the first, the second and the fourth embodiment.

While the invention has been shown and disclosed above in connection with several embodiments thereof, it should be understood that a number of changes, modifications and substitutions therein will readily occur to one skilled in the art from the above disclosure without departing from the spirit and scope of the invention as defined by the appended claims.

What is claimed is:

1. An intensifier assembly for a vehicle braking unit, the braking unit including a booster connected to a brake pedal to boost a braking liquid when the brake pedal is depressed, a master cylinder connected to the booster to receive the boosted braking liquid from the booster and to generate a pressurized braking liquid for application to a wheel cylinder in response to receiving the boosted braking liquid, said intensifier assembly including:

an intensifier unit including:
  a casing, said casing being shaped to have an inlet through which pressurized braking liquid from the master cylinder is received and an outlet opposite said inlet through which braking liquid is discharged to the wheel cylinder;
  a movable piston disposed in said casing, said piston having a front end located adjacent said casing inlet and a rear end located adjacent said casing outlet; and
  a biasing mechanism extending between said casing and said piston for urging said piston towards said casing inlet; and
  a control valve disposed in said piston for controlling actuation of said piston, said control valve including:
    a fluid passageway formed in said piston so as to extend between said piston front end and said piston rear end so as to allow braking liquid flow through said piston;
    a valve member slidably movable in said piston, said valve member having a valve seat disposed in said fluid passageway and movable between a open position for allowing braking liquid fluid flow through said fluid passageway and a closed position that blocks braking liquid flow through said fluid passageway;
    a pressure chamber formed in said piston around said valve member by at least one surface of said valve member and connected to receive boosted braking liquid from the booster, said pressure chamber being positioned so that when the boosted braking liquid is applied thereto, said valve member is urged towards said valve seat open position; and
    a spring disposed in said piston and positioned against said valve member for urging said valve member towards said valve seat closed position, said spring being configured to operate in opposition to said force imposed by the boosted braking liquid in said control valve pressure chamber so that when the force of the boosted braking liquid falls, said spring urges said valve member to said valve seat closed position.

2. The intensifier unit of claim 1, wherein:
said intensifier unit piston has a stepped configuration having a large diameter section location adjacent said casing inlet that forms said piston front end and a small diameter section integral with said large diameter section, said small diameter section being located adjacent said casing outlet and forming said piston rear end; and
said casing is formed with a large diameter bore in which said piston large diameter section is disposed and a small diameter bore contiguous with said small diameter bore in which said piston small diameter section is at least partially disposed.

3. The intensifier assembly of claim 2, wherein said intensifier unit biasing mechanism is a spring, said intensifier mechanism spring being configured to extend between a surface of said casing defining said large diameter bore and said piston large diameter section.

4. The intensifier assembly of claim 2, wherein said intensifier unit biasing mechanism is a spring, said intensifier mechanism spring being configured to extend between a surface of said casing defining said small diameter bore and said piston small diameter section.

5. The intensifier assembly of claim 1, wherein said intensifier unit biasing mechanism is a spring.

6. The intensifier assembly of claim 1, wherein said valve seat of said valve member of said control valve is a ball mounted to said valve member.

7. A braking unit including:
a master cylinder for applying a braking liquid pressure to a wheel cylinder;
a liquid pressure booster disposed between a brake pedal and the master cylinder for boosting a force with which the brake pedal is depressed upon depression of the brake pedal at a given ratio before it is transmitted to the master cylinder;

an intensifier mechanism disposed in a braking liquid path which provides communication between a wheel cylinder and the master cylinder that is adapted to be actuated to intensify the braking liquid pressure of the master cylinder for transmission to the wheel cylinder; and a control valve assembled into the intensifier mechanism for actuating the intensifier mechanism upon failure of the liquid pressure booster or a source of liquid pressure associated therewith wherein:

the intensifier mechanism includes:

a stepped piston slidably fitted in a liquid tight manner in a stepped through-bore formed in a casing;

a first pressure chamber formed within the casing adjacent to a large diameter portion of the stepped piston and communicating with the master cylinder;

a second pressure chamber formed within the casing adjacent to a small diameter portion of the stepped piston and communicating with the wheel cylinder;

a third pressure chamber formed within the casing at a location opposite to a stepped end face of the stepped piston and communicating with either a power chamber of the liquid pressure booster or a source of liquid pressure associated with the liquid pressure booster; and a return spring disposed in the casing for returning the stepped piston to its operative position; and the control valve includes:

a first communication path formed within the stepped piston for providing a communication between the first pressure chamber and the second pressure chamber;

a sliding member slidably fitted in the first communication path, the sliding member including a large diameter portion at a median portion along the length thereof and having one of its axial ends facing the second pressure chamber through the first communication path and having the other end disposed to face the first pressure chamber through the first communication path;

a second communication path axially extending through the sliding member;

a valve element disposed on the end of the second communication path which is located adjacent the first pressure chamber so as to be movable lengthwise along the second communication path, the valve element being urged by a first spring disposed within the second communication path toward the outside of the second communication path;

a stop member disposed on the sliding member at a location adjacent to the valve element for preventing the valve element from projecting outwardly beyond a given amount from the second communication path;

an annular valve seat formed in the first communication path so as to be located opposite to the valve element and allowing the valve element to be seated thereon;

an engaging member disposed within the first pressure chamber and including a distal end which extends into the first communication path to abut against the valve element to cause the valve element to be displaced away from the valve seat against the resilience of the first spring when the stepped piston remains at rest in its operative position;

a fourth pressure chamber formed within the stepped piston on the side of the large diameter portion of the sliding member which is located toward the first pressure chamber;

a path allowing the fourth pressure chamber to communicate with the intensifier third pressure chamber;

a spring chamber formed within the stepped piston on the side of a large diameter portion of the sliding member which is located toward the second pressure chamber;

a second spring disposed within the spring chamber for urging the sliding member toward the first pressure chamber; and a path allowing the spring chamber to communicate with the atmosphere or a reservoir.

8. A braking unit according to claim 7 wherein seal means are disposed around the outer periphery of each of the large diameter portion and of the small diameter portion of the stepped piston for maintaining a liquid tightness between the stepped piston and an inner peripheral surface of the stepped through-bore formed in the casing, one of the seal means disposed around the outer periphery of either the large or the small diameter portion of the stepped piston including a pair of ring-shaped seal members which are axially spaced apart by a given distance and an outer peripheral portion of the stepped piston which is located intermediate the pair of seal members being in communication with the reservoir through paths formed in the stepped piston and the casing.

9. An intensifier assembly for a vehicle braking unit, the braking unit including a booster connected to a brake pedal to boost a braking liquid when the brake pedal is depressed, a master cylinder connected to the booster to receive the boosted braking liquid from the booster and to generate a pressurized braking liquid for application to a wheel cylinder in response to receiving the boosted braking liquid, said intensifier assembly including:

an intensifier unit including:

a casing, said casing being shaped to have a large diameter bore, an inlet in fluid communication with said large diameter bore through which pressurized braking liquid from the master cylinder is received, a small diameter bore contiguous with and coaxial with said large diameter bore and an outlet opposite said inlet through which braking liquid is discharged from said small diameter bore to the wheel cylinder;

a movable, stepped piston disposed in a liquid tight manner in said casing, said piston having a large diameter section disposed in said casing large diameter bore, a front end formed by said piston large diameter section, said front end located adjacent said casing inlet, a small diameter section integral with and coaxial with said large diameter section and located partially in said casing large diameter bore and partially in said casing small diameter bore, a rear end formed by said piston small diameter section, said read end being located adjacent said casing outlet;

an intensifier spring extending between said casing and said piston for urging said piston front end toward said casing inlet; and an intensifier pressure chamber defined in said casing large diameter bore so as to be positioned around said piston small diameter section; and a communications passageway formed in said casing for connecting said intensifier pressure chamber with the boosted braking liquid from the booster; and a control valve disposed in said piston for controlling actuation of said piston, said control valve including:

a fluid passageway formed in said piston so as to extend between said piston front end and said piston rear end so as to allow braking liquid flow through said piston;

a valve member slidably movable in said piston, said valve member having a valve seat disposed in said fluid passageway that is movable between a open position for allowing braking liquid flow through said fluid passageway and a closed position that blocks braking liquid flow through said fluid passageway;

a control valve pressure chamber formed in said piston around said valve member by at least one surface of said valve member, said control valve pressure chamber including a fluid communication path for connecting said control valve pressure chamber with said intensifier pressure chamber so that said control valve pressure chamber can receive the boosted braking liquid from said intensifier pressure chamber, said pressure chamber being positioned so that when the boosted braking liquid is applied thereto, said valve member is urged towards said valve seat open position; and a control valve spring disposed in said piston and positioned against said valve member for urging said valve member towards said valve seat closed position, said control valve spring being configured to operate in opposition to the force imposed by the boosted braking liquid in said control valve pressure chamber so that when the force of the boosted braking liquid falls, said control valve spring urges said valve member to said valve seat closed position.

10. The intensifier assembly of claim 9, wherein said intensifier unit spring is located in said intensifier pressure chamber.

11. The intensifier assembly of claim 9, wherein said intensifier unit spring extends between a surface of said casing defining said small diameter bore and said piston small diameter section.

12. The intensifier assembly of claim 3, wherein said intensifier unit valve seat is a ball mounted to said valve member.

13. An intensifier assembly for a vehicle braking unit, the braking unit including a booster connected to a brake pedal to boost a braking liquid when the brake pedal is depressed, a master cylinder connected to the booster to receive the boosted braking liquid from the booster and to generate a pressurized braking liquid for application to a wheel cylinder in response to receiving the boosted braking liquid, said intensifier assembly including:

an intensifier unit including:

a casing, said casing being shaped to have a large diameter bore, an inlet in fluid communication with said large diameter bore through which pressurized braking liquid from the master cylinder is received, a small diameter bore contiguous with and coaxial with said large diameter bore and an outlet opposite said inlet through which braking liquid is discharged from said small diameter bore to the wheel cylinder;

a movable, stepped piston disposed in a liquid tight manner in said casing, said piston having a large diameter section disposed in said casing large diameter bore, said piston large diameter section and said casing forming a first pressure chamber in said casing large diameter bore that is in fluid communication with said casing inlet, a small diameter section integral with and coaxial with said large diameter section, said piston small diameter section and said casing forming a second pressure chamber in said casing small diameter bore that is in fluid communication with said casing outlet;

an intensifier spring extending between said casing and said piston for urging said piston towards said casing inlet;

a control valve disposed in said piston for controlling actuation of said piston, said control valve including:

a first fluid passageway formed in said piston so as to extend between said first pressure chamber and said second pressure chamber so as to allow braking liquid flow through said piston;

a valve member slidably movable in said piston between a first position distal from said casing inlet and a second position proximal to said casing inlet;

a third pressure chamber formed in said piston around said valve member by at least one surface of said valve member and connected to receive boosted braking liquid from the booster, said third pressure chamber being positioned so that when the boosted braking liquid is applied thereto, said valve member is urged towards said first position;

a spring chamber formed in said piston around said valve member by at least one surface of said valve member, said spring chamber including a second fluid passageway in through which the braking liquid in said second pressure chamber can flow into said spring chamber and act in opposition to the braking liquid in said third pressure chamber;

a control valve spring disposed in said spring chamber for urging said valve member towards said second position, said control valve spring being configured to operate in opposition to the force imposed by the boosted braking liquid in said third pressure chamber so that when the force of the boosted braking liquid falls, said control valve spring urges said valve member to said second position; and a first valve seat attached to said valve member so as to move in unison with said valve member and selectively positioned in said first fluid passageway whereby, when said valve member is in said first position, said first valve seat allows braking liquid flow through said first fluid passageway and when said valve member is in said second position, said first valve seats blocks fluid flow through said first fluid passageway; and a second valve seat attached to said valve member so as to move in unison with said valve member and selectively positioned in said second fluid passageway whereby, when said valve member is in said first position, said second valve seat blocks braking liquid flow through said second fluid passageway to said spring chamber and when said valve member is in said second position, said second valve seat allows braking liquid flow from said second pressure chamber through said second fluid passageway to said spring chamber.

14. The intensifier assembly of claim 13, wherein said intensifier unit spring extends between a surface of said casing defining said small diameter bore and said piston small diameter section.

15. The intensifier assembly of claim 14, wherein said intensifier unit valve seat is a ball mounted to said valve member.

16. The intensifier assembly of claim 13, wherein said intensifier unit valve seat is a ball mounted to said valve member.

17. An intensifier assembly for a vehicle braking unit, the braking unit including a booster connected to a brake pedal to boost a braking liquid when the brake pedal is depressed, a master cylinder connected to the booster to receive the boosted braking liquid from the booster and to generate a pressurized braking liquid for application to a wheel cylinder in response to receiving the boosted braking liquid, said intensifier assembly including:

an intensifier unit including:
- a casing, said casing being shaped to form a stepped bore having a large diameter section and a small diameter section coaxial with said large diameter section, an inlet in fluid communication with said large diameter bore through which the pressurized braking fluid from the master cylinder is received and an outlet opposite said inlet through which pressurized braking liquid is discharged to the wheel cylinder;
- a movable, stepped piston disposed in said casing bore, said piston having a large diameter section disposed in said casing bore large diameter section and a small diameter section partially disposed in said casing small diameter section and partially disposed in said casing large diameter section, said piston being dimensioned to form a first pressure chamber in said casing large diameter bore adjacent said casing inlet, a second pressure chamber in said casing small diameter bore located adjacent said casing outlet and a third pressure chamber in said casing large diameter bore around a portion of said small diameter section that extends into said large diameter bore; and
- a spring in said casing bore for urging said piston towards said casing inlet; and a control unit for regulating displacement of said intensifier unit piston, said control unit including:
- a fluid passageway formed in said piston so as to provide fluid communication between said first and second intensifier unit pressure chambers;
- a control valve disposed in said fluid passageway and being positioned so that when said piston is located adjacent said casing inlet, said control valve allows braking liquid flow through said fluid passageway and when said piston is displaced from away from said casing inlet, said control valve slows braking liquid flow through said fluid passageway and then closes said fluid passageway so as to block fluid flow therethrough;
- a switching valve connected at one end to said master cylinder for receiving the pressurized braking liquid therefrom and at an opposed end to said intensifier unit to said intensifier unit third pressurized chamber, said switching valve having a first position for allowing braking liquid flow from the master cylinder to said intensifier unit third pressure chamber and a second position selectively connecting said intensifier unit third pressure chamber to a low-pressure exhaust port;
- a pressure-responsive connector between said switching valve body and the booster for receiving the boosted braking liquid from the booster, whereby when said boosted braking liquid is received, said connector holds said switching valve in said first position; and
- a biasing spring connected to said switching valve for moving said switching valve to said second position when pressure of the boosted braking liquid falls.

18. The intensifier assembly of claim 17, wherein said intensifier unit spring is located in said intensifier unit third pressure chamber.

19. The intensifier assembly of claim 17, wherein said control unit control valve includes: a valve body disposed in said fluid passageway; a valve seat surface formed around said fluid passageway adjacent said valve body; a standoff post formed integrally with said intensifier unit casing, said standoff post being positioned to extend into said fluid passageway so as to hold said valve body away from said valve seat when said piston is located adjacent said casing inlet.

20. The intensifier assembly of claim 19, wherein said valve body of said control unit control valve is positioned in said fluid passageway to move relative to said intensifier unit casing and said intensifier unit piston and said control valve further includes a valve spring for urging said valve body towards said valve seat.

* * * * *

UNITED STATES PATENT AND TRADEMARK OFFICE
CERTIFICATE OF CORRECTION

PATENT NO. : 5,577,384
DATED : November 26, 1996
INVENTOR(S) : Satoru WATANABE et al It is certified that error appears in the above-indentified patent and that said Letters Patent is hereby corrected as shown below:

Column 17, line 13; after "therewith" insert ---,---.
Column 18, line 57; change "read" to ---rear---.
Column 19, line 42; change "3" to ---9---.

Signed and Sealed this

Twenty-sixth Day of August, 1997

Attest:

BRUCE LEHMAN

Attesting Officer

Commissioner of Patents and Trademarks